United States Patent [19]
Huang

[11] Patent Number: 5,915,415
[45] Date of Patent: Jun. 29, 1999

[54] FLOW CONTROL VALVE ASSEMBLY WITH TEMPERATURE INDICATING CAPABILITY FOR A WATER CONVEYING DEVICE

[76] Inventor: Tien-Tsai Huang, No. 4, Lane 30, Wu-Chuan St., Pan-Chiao City, Taipei Hsien, Taiwan

[21] Appl. No.: 08/903,326

[22] Filed: Jul. 17, 1997

[51] Int. Cl.$^6$ .................................................. F16K 37/00
[52] U.S. Cl. ...................... 137/551; 374/141; 374/148; 236/93 B
[58] Field of Search .............................. 137/551; 374/141, 374/148

[56] References Cited

U.S. PATENT DOCUMENTS

| | | | |
|---|---|---|---|
| 1,978,623 | 10/1934 | Clifford | 236/93 B |
| 4,509,550 | 4/1985 | Monk | 137/551 |
| 4,682,626 | 7/1987 | Bergmann | 137/551 |

FOREIGN PATENT DOCUMENTS

| | | | |
|---|---|---|---|
| 1278198 | 6/1972 | United Kingdom | 236/101 B |

*Primary Examiner*—A. Michael Chambers
*Attorney, Agent, or Firm*—Sheridan Ross P.C.

[57] ABSTRACT

A flow control valve assembly is adapted for use with a water conveying device which is provided with a supply channel, a valve chamber, first and second outlet passages communicated fluidly with the valve chamber, and a mounting hole. The flow control valve assembly is mounted to the water conveying device at the mounting hole with the use of a tubular mount, and includes a piston shaft movable between a first valve position, where water from the supply channel flows through the second outlet passage, and a second valve position, where water from the supply channel flows through the first outlet passage. The flow control valve assembly further includes a temperature sensor for detecting the temperature of water in the valve chamber, and an indicator unit associated operably with the temperature sensor so as to indicate the water temperature in the valve chamber thereon.

9 Claims, 5 Drawing Sheets

FLOW CONTROL VALVE ASSEMBLY WITH TEMPERATURE INDICATING CAPABILITY FOR A WATER CONVEYING DEVICE

BACKGROUND OF THE INVENTION

1. Field of the Invention

The invention relates to a flow control valve assembly, more particularly to a flow control valve assembly with a temperature indicating capability for use with a water conveying device, such as a hot-and-cold water faucet and the like.

2. Description of the Related Art

Water conveying devices which are capable of conveying both hot and cold water are known in the art. A conventional hot-and-cold water conveying device incorporates a flow control valve assembly to control the flow of water to a selected one of a faucet spout and a shower head. While many different kinds of temperature indicators are available in the art, mounting of a temperature indicator on the conventional water conveying device is currently not possible unless the design of the mold for the water conveying device is modified to accommodate the temperature indicator, thereby resulting in increased costs.

SUMMARY OF THE INVENTION

The object of the present invention is to provide a modified flow control valve assembly which has a temperature indicating capability and which can be easily installed on a conventional water conveying device without the need for changing the design of the mold for the water conveying device.

According to one aspect of the present invention, a flow control valve assembly has a temperature indicating capability and is adapted for use with a water conveying device which is provided with a supply channel for discharging water therefrom, a valve chamber communicated fluidly with the supply channel, first and second outlet passages communicated fluidly with the valve chamber and provided with a respective valve seat portion, and a mounting hole for accessing the valve chamber and aligned axially with the valve seat portions of the first and second outlet passages. The flow control valve assembly comprises:

- a tubular mount adapted to be mounted in the mounting hole of the water conveying device;
- a piston shaft unit including: a hollow shaft body with a first end portion, a second end portion and an intermediate portion between the first and second end portions, the second end portion of the shaft body being adapted to extend through the valve seat portion in one of the first and second outlet passages when the intermediate portion extends sealingly and slidably into the tubular mount; and a temperature sensor disposed within the shaft body for detecting the temperature of water in the valve chamber;
- an indicator unit mounted on the first end portion of the shaft body and associated operably with the temperature sensor so as to indicate the water temperature in the valve chamber thereon; and
- a piston coupled to the second end portion of the shaft body and adapted to be received in the valve chamber, the piston being movable with the shaft body in the valve chamber between a first valve position, where the piston is adapted to block the valve seat portion of the first outlet passage so that the water from the supply channel is forced to flow through the second outlet passage, and a second valve position, where the piston is adapted to block the valve seat portion of the second outlet passage so that the water from the supply channel is forced to flow through the first outlet passage.

According to another aspect of the present invention, a flow control valve assembly has a temperature indicating capability and is adapted for use with a water conveying device which is provided with a supply channel unit for discharging water therefrom, a valve chamber communicated fluidly with the supply channel unit, first and second outlet passages communicated fluidly with the valve chamber and provided with a respective valve seat portion, the valve seat portions of the first and second outlet passages being aligned axially, and a radial mounting hole for accessing the valve chamber and disposed between the valve seat portions of the first and second outlet passages. The flow control valve assembly comprises:

- a piston shaft adapted to be disposed in the valve chamber and movable between a first valve position, where the piston shaft is adapted to block the valve seat portion of the first outlet passage so that the water from the supply channel unit is forced to flow through the second outlet passage, and a second valve position, where the piston shaft is adapted to block the valve seat portion of the second outlet passage so that the water from the supply channel unit is forced to flow through the first outlet passage;
- a tubular mount adapted to be mounted in the mounting hole of the water conveying device;
- a piston actuator including: a rotary actuator adapted to be disposed in the valve chamber and coupled to the piston shaft such that axial rotation of the rotary actuator results in linear movement of the piston shaft in the valve chamber between the first and second valve positions; a hollow shaft body with a first end portion and an opposite second end portion which extends sealingly and rotatably into the tubular mount and which is coupled to the rotary actuator for rotating the rotary actuator; and a temperature sensor disposed within the shaft body for detecting temperature of water in the valve chamber; and
- an indicator unit mounted securely on the first end portion of the shaft body and associated operably with the temperature sensor so as to indicate the water temperature in the valve chamber thereon.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
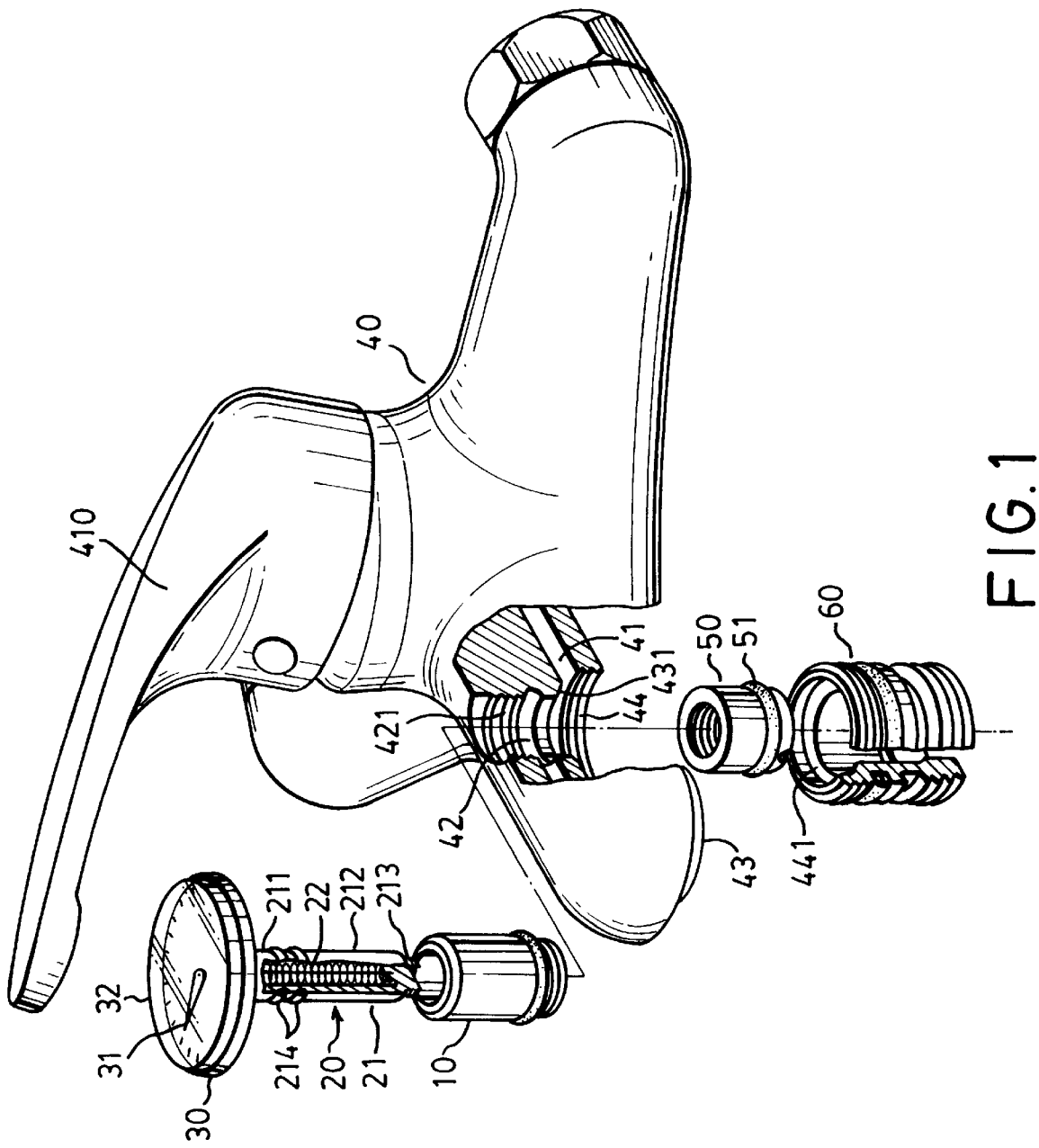
FIG. 1 is an exploded view of the first preferred embodiment of a flow control valve assembly according to the present invention, the flow control valve assembly being applicable to a conventional hot-and-cold water faucet.
Figure 2:
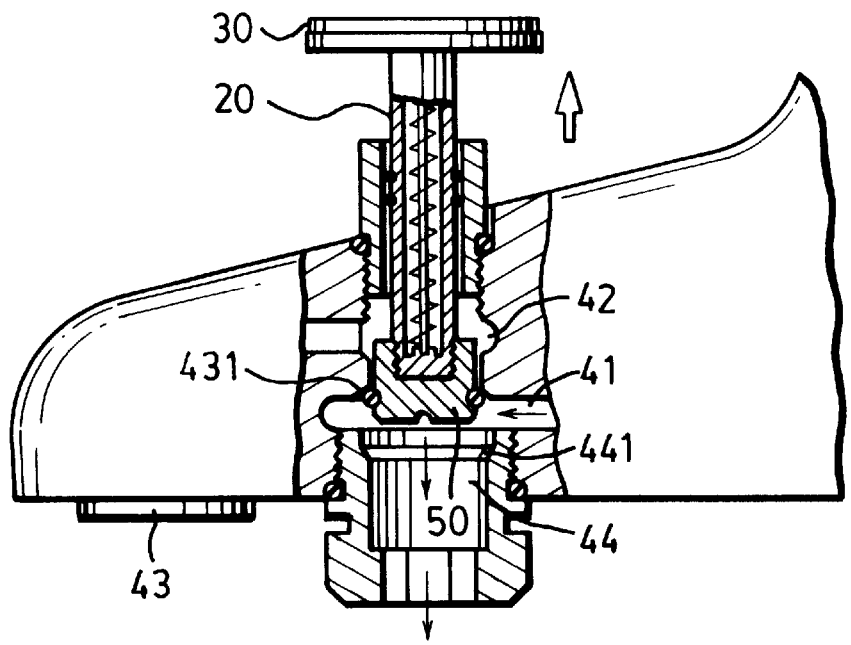
FIG. 2 is a sectional view illustrating the first preferred embodiment in a first valve position when applied to the conventional hot-and-cold water faucet of FIG. 1.

Referring to FIGS. 1 and 2, the first preferred embodiment of a flow control valve assembly according to the present invention is shown to be applicable to a conventional water conveying device, e.g. a single-lever-type hot-and-cold water faucet 40. The water faucet 40 is provided with a supply channel 41 for discharging water therefrom. By operating a lever 410 of the water faucet 40, the amounts of hot and cold water flowing into the supply channel 41 can be varied in order to adjust the temperature of the water flowing through the supply channel 41. The water faucet 40 is further provided with a valve chamber 42 communicated fluidly with the supply channel 41 on one end of the latter, first and second outlet passages 43, 44 communicated fluidly with the valve chamber 42 and provided with a respective valve seat portion 431, 441, and an internally threaded mounting hole 421 for accessing the valve chamber 42 via the upper side of the latter. The mounting hole 421 is aligned axially with the valve seat portions 431, 441. Thus, water from the supply channel 41 flows through the second outlet passage 44 when the valve seat portion 431 is blocked, and flows through the first outlet passage 43 when the valve seat portion 441 is blocked. The first outlet passage 43 is formed as a faucet spout. The second outlet passage 44 is disposed at the lower side of the valve chamber 42 and is threaded internally for engaging an externally threaded coupling ring 60 which has the valve seat portion 441 formed in an upper section thereof. The coupling ring 60 serves as a connection between the water faucet 40 and one end of a flexible tube of a conventional shower head unit (not shown).

The flow control valve assembly comprises a tubular mount 10, a piston shaft unit 20, an indicator unit 30 and a piston 50.

The tubular mount 10 has an externally threaded lower end portion which is adapted to be mounted threadedly and sealingly in the mounting hole 421.

The piston shaft unit 20 includes a hollow shaft body 21 and a temperature sensor 22 disposed within the shaft body 21. The shaft body 21 is preferably made of a heat conductive metal material, such as copper, and has an upper first end portion 211, a lower second end portion 213 and an intermediate portion 212 between the first and second end portions 211, 213. The intermediate portion 212 is provided with a pair of seal rings 214 therearound and extends sealingly and slidably into the tubular mount 10. In this embodiment, the temperature sensor 22 is a bimetallic temperature sensor found in conventional bimetallic thermometers.

The indicator unit 30 is mounted on the first end portion 211 of the shaft body 21 and has a pointer 31 which is associated operably with the temperature sensor 22 for temperature indication. Since the feature of the present invention does not reside in the particular connection between the temperature sensor 22 and the pointer 31, and since such a connection is commonly found in conventional bimetallic thermometers, a detailed description of the same will be dispensed with herein. The indicator unit 30 further has a magnifying face plate 32 mounted thereon.

The piston 50 is made of the same material as the shaft body 21 and has a seal ring 51 provided therearound. The piston 50 is adapted to be received in the valve chamber 42 via the second outlet passage 44 before the coupling ring 60 is mounted to the water faucet 40. The second end portion 213 of the shaft body 21 extends through the valve seat portion 431 for threaded coupling with the piston 50.

Figure 3:
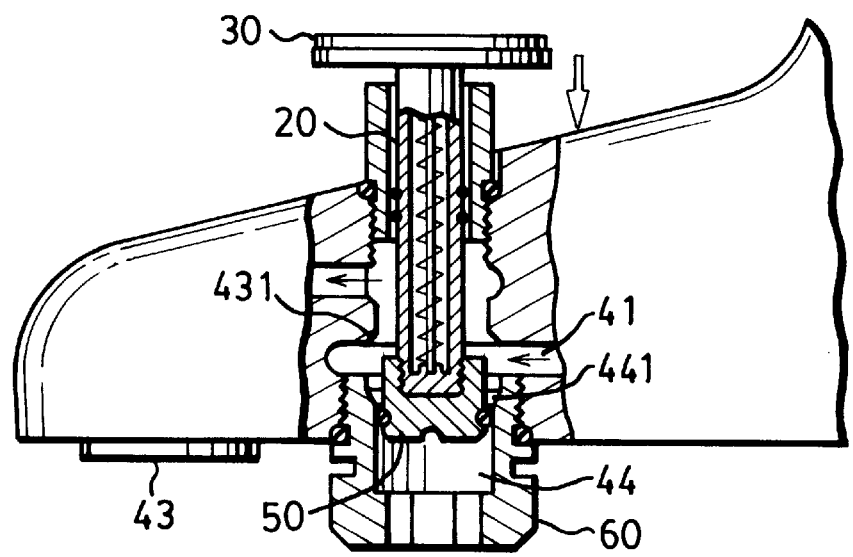
FIG. 3 is a sectional view illustrating the first preferred embodiment in a second valve position when applied to the conventional hot-and-cold water faucet of FIG. 1.

Referring to FIGS. 2 and 3, due to the heat conductive properties of the shaft body 21 and the piston 50, the temperature sensor 22 can detect the temperature of the water in the valve chamber 42 and operate the pointer 31 so as to enable the indicator unit 30 to indicate the water temperature in the valve chamber 42 thereon. In addition, when the piston shaft unit 20 is pulled upwardly at the indicator unit 30 such that the piston 50 blocks the valve seat portion 431, as shown in FIG. 2, water from the supply channel 41 is forced to flow through the second outlet passage 44. In contrast, when the piston shaft unit 20 is pushed downwardly at the indicator unit 30 such that the piston 50 blocks the valve seat portion 441, as shown in FIG. 3, water from the supply channel 41 is forced to flow through the first outlet passage 43.

Figure 4:
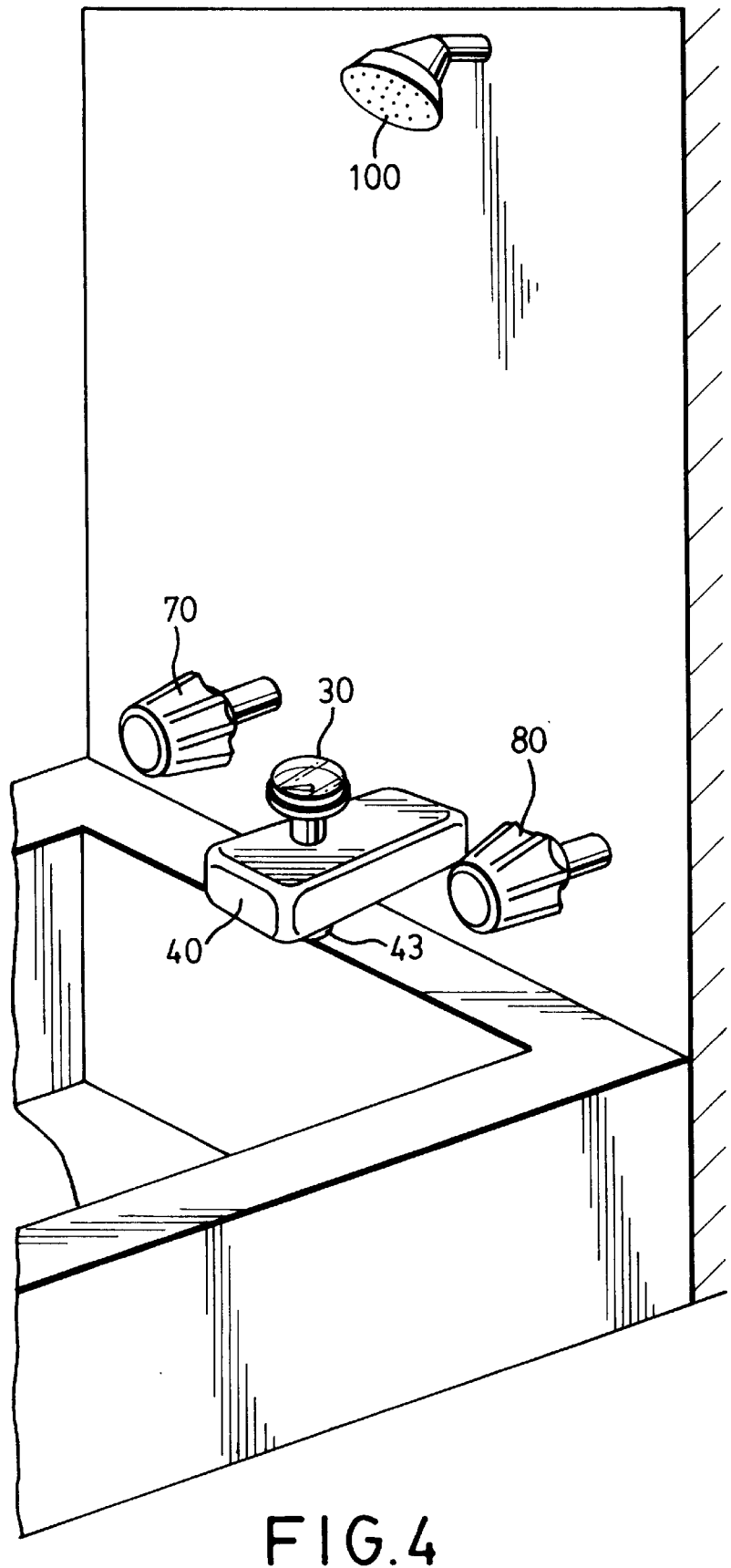
FIG. 4 is a perspective view of another conventional water conveying device which is applied with the first preferred embodiment.

The application of the flow control valve assembly of this embodiment should not be limited to the single-lever-type hot-and-cold water faucet 40 described beforehand. As shown in FIG. 4, the flow control valve assembly can also be applied to a conventional water conveying device which utilizes separate hot and cold water handles 70, 80 to control the amounts of hot and cold water that can flow through a water faucet 40 or a shower head 100. The flow control valve assembly is applied to the water conveying device of FIG. 4 in a manner substantially similar to that detailed hereinbefore, and is operable so as to control the water flow through a selected one of the water faucet 40 and the shower head 100.

Figure 5:
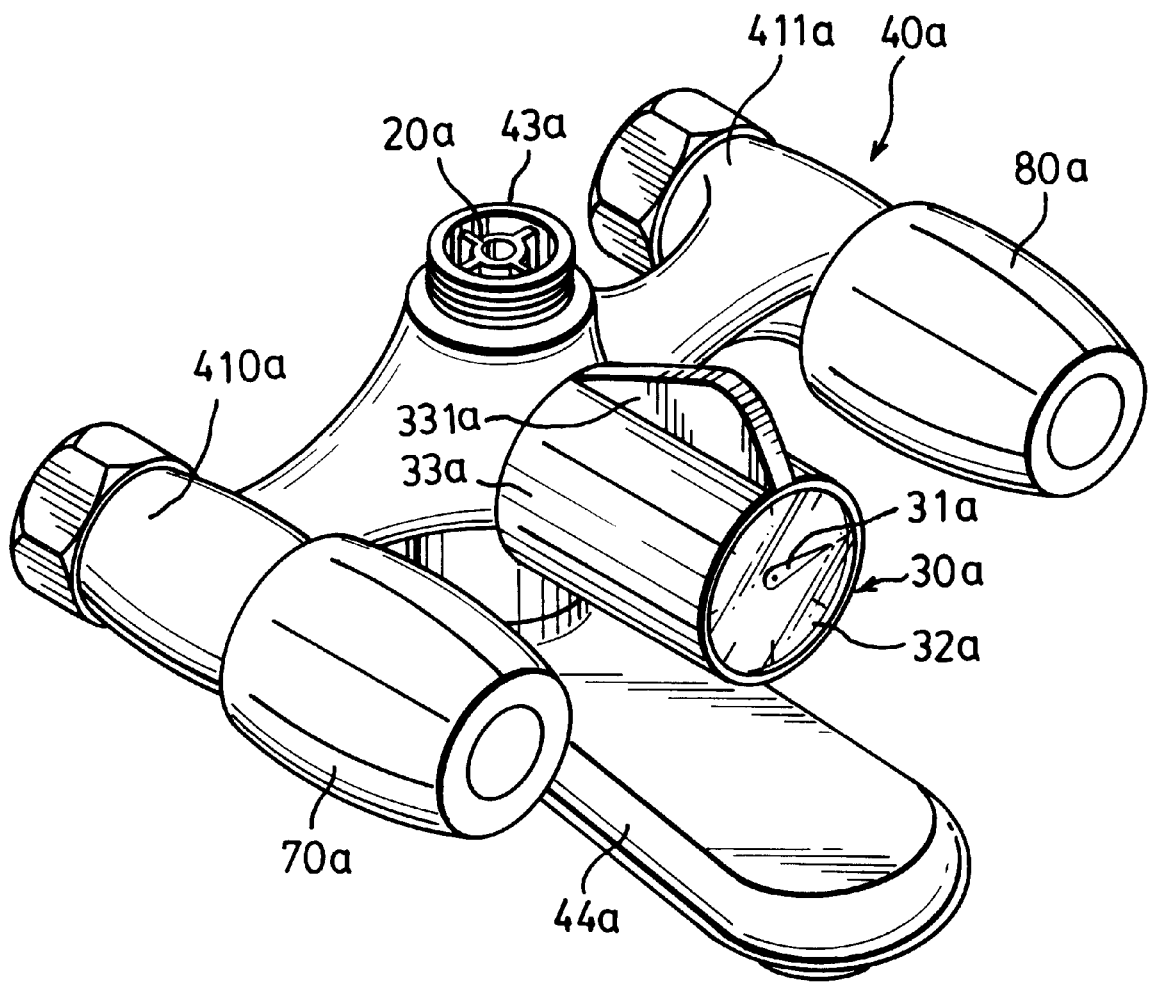
FIG. 5 is a perspective view of still another conventional water conveying device which is applied with the second preferred embodiment of a flow control valve assembly according to the present invention.
Figure 6:
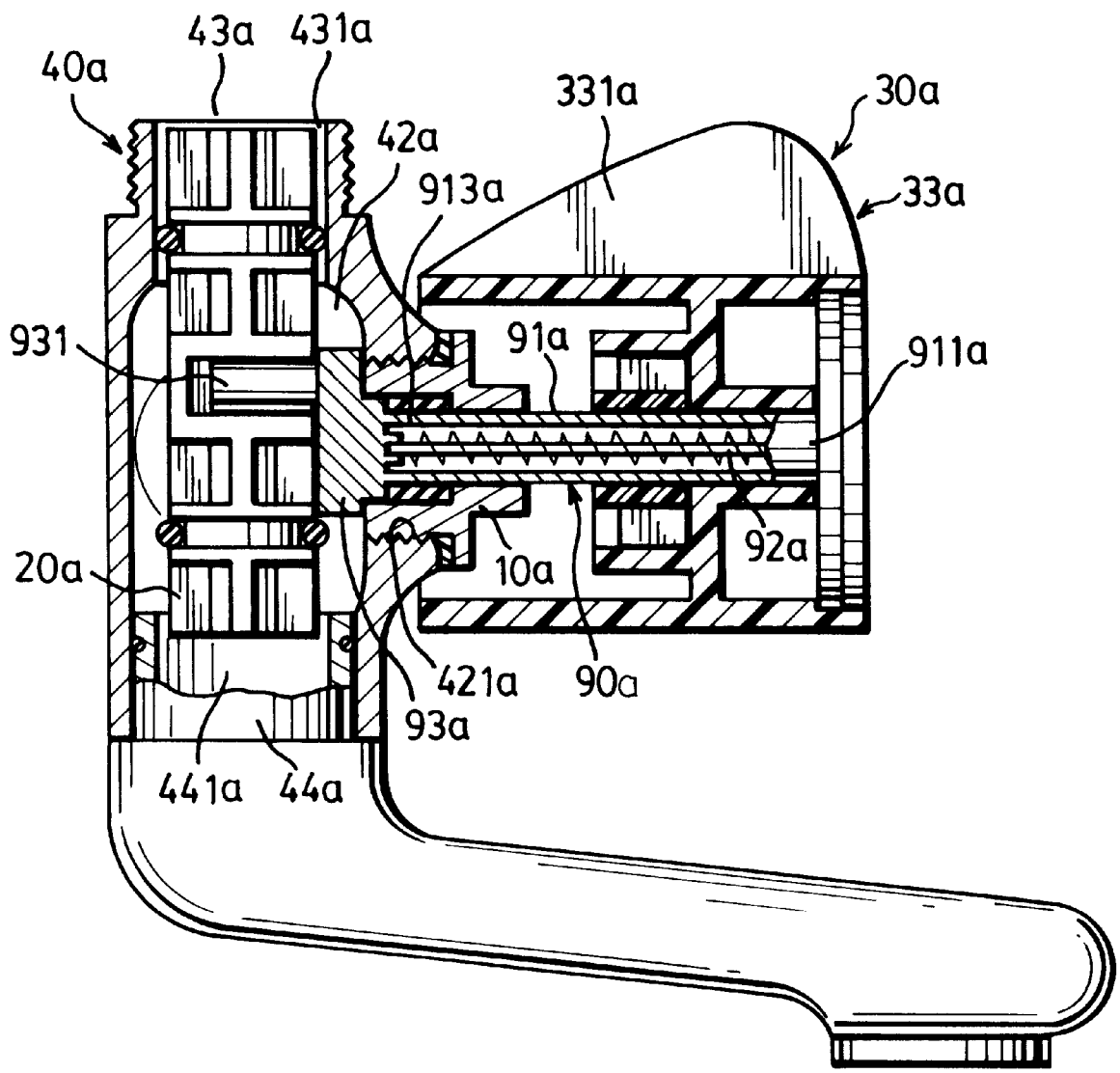
FIG. 6 is a sectional view illustrating the second preferred embodiment when applied to the conventional water conveying device of FIG. 5.

Referring to FIGS. 5 and 6, the second preferred embodiment of a flow control valve assembly according to the present invention is shown to be applicable to a conventional water conveying device 40a which is provided with a supply channel unit that is constituted by hot and cold water supply channels 410a, 411a and separate hot and cold water handles 70a, 70b for controlling the amounts of hot and cold water that flow respectively through the supply channels 410a, 411a. The water conveying device 40a is further provided with a valve chamber 42a disposed between and communicated fluidly with the supply channels 410a, 411a, first and second outlet passages 43a, 44a communicated fluidly with the valve chamber 42a and provided with a respective valve seat portion 431a, 441a, and an internally threaded radial mounting hole 421a for accessing the valve chamber 42a and disposed between the first and second outlet passages 43a, 44a. Water from the supply channels 410, 411 flows through the second outlet passage 44a when the valve seat portion 431a is blocked, and flows through the first outlet passage 43a when the valve seat portion 441a is blocked. The valve seat portions 431a, 441a of the first and second outlet passages 43a, 44a are aligned axially. Unlike the water conveying device 40 of FIGS. 1 to 3, the mounting hole 421a in the water conveying device 40a is transverse to the valve seat portions 431a, 441a. The first outlet passage 43a is threaded externally for engaging one end of a flexible tube of a conventional shower head unit (not shown). The second outlet passage 44a is formed as a faucet spout.

The flow control valve assembly of this embodiment comprises a tubular mount 10a, a piston shaft 20a, a piston actuator 90a and an indicator unit 30a.

The tubular mount 10a has an externally threaded portion which is adapted to be mounted threadedly and sealingly in the mounting hole 421a.

The piston shaft 20a is adapted to be disposed in the valve chamber 42a via the first outlet passage 43a and is movable between a first valve position, where the piston shaft 20a is adapted to block the valve seat portion 431a of the first outlet passage 43a so that the water from the supply channels 410a, 411a is forced to flow through the second outlet passage 44a, and a second valve position, where the piston shaft 20a is adapted to block the valve seat portion 441a of the second outlet passage 44a so that the water from the supply channels 410a, 411a is forced to flow through the first outlet passage 43a.

The piston actuator 90a includes a rotary actuator 93a adapted to be disposed in the valve chamber 42a and formed with an eccentric pin 931 that is coupled to the piston shaft 20a such that axial rotation of the rotary actuator 93a results in linear movement of the piston shaft 20a in the valve chamber 42a between the first and second valve positions. The piston actuator 90a further includes a hollow shaft body 91a and a temperature sensor 92a disposed within the shaft body 91a. The shaft body 91a has a first end portion 911a and an opposite second end portion 913a which extends sealingly and rotatably into the tubular mount 10a and which is coupled to the rotary actuator 93a for rotating the latter. In this embodiment, the shaft body 91a and the rotary actuator 93a are made of a heat conductive metal material. As with the previous embodiment, the temperature sensor 92a is a bimetallic temperature sensor found in conventional bimetallic thermometers.

The indicator unit 30a is mounted securely on the first end portion 911a of the shaft body 91a and has a pointer 31a which is associated operably with the temperature sensor 92a for temperature indication. The indicator unit 30a is formed with an annular skirt 33a for concealing the shaft body 91a therein. The annular skirt 33a is formed with a radial tab 331a to facilitate rotation of the shaft body 91a. Like the previous embodiment, the indicator unit 30a further has a magnifying face plate 32a mounted thereon.

Due to the heat conductive properties of the shaft body 91a and the rotary actuator 93a, the temperature sensor 92a can detect the temperature of the water in the valve chamber 42a and operate the pointer 31a so as to enable the indicator unit 30a to indicate the water temperature in the valve chamber 42 thereon.

It has thus been shown that flow control valve assembly according to this invention can be easily installed on a conventional water conveying device and can provide the functions of temperature indication and water flow control without the need for changing the design of the mold for the water conveying device. The object of this invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A flow control valve assembly with a temperature indicating capability and adapted for use with a water conveying device which is provided with a supply channel for discharging water therefrom, a valve chamber communicated fluidly with the supply channel, first and second outlet passages communicated fluidly with the valve chamber and provided with a respective valve seat portion, and a mounting hole for accessing the valve chamber and aligned axially with the valve seat portions of the first and second outlet passages, said flow control valve assembly comprising:

a tubular mount adapted to be mounted in the mounting hole of the water conveying device;

a piston shaft unit including: a hollow shaft body with a first end portion, a second end portion and an intermediate portion between said first and second end portions, said second end portion of said shaft body being adapted to extend through the valve seat portion in one of the first and second outlet passages when said intermediate portion extends sealingly and slidably into said tubular mount; and a temperature sensor disposed within said shaft body for detecting temperature of water in the valve chamber;

an indicator unit mounted on said first end portion of said shaft body and associated operably with said temperature sensor so as to indicate the water temperature in the valve chamber thereon; and a piston coupled to said second end portion of said shaft body and adapted to be received in the valve chamber, said piston being movable with said shaft body in the valve chamber between a first valve position, where said piston is adapted to block the valve seat portion of the first outlet passage so that the water from the supply channel is forced to flow through the second outlet passage, and a second valve position, where said piston is adapted to block the valve seat portion of the second outlet passage so that the water from the supply channel is forced to flow through the first outlet passage.

2. The flow control valve assembly of claim 1, wherein said shaft body and said piston are made of a heat conductive metal material.

3. The flow control valve assembly of claim 1, wherein said indicator unit has a magnifying face plate mounted thereon.

4. A flow control valve assembly with a temperature indicating capability and adapted for use with a water conveying device which is provided with a supply channel unit for discharging water therefrom, a valve chamber communicated fluidly with the supply channel unit, first and second outlet passages communicated fluidly with the valve chamber and provided with a respective valve seat portion, the valve seat portions of the first and second outlet passages being aligned axially, and a radial mounting hole for accessing the valve chamber and disposed between the valve seat portions of the first and second outlet passages, said flow control valve assembly comprising:

a piston shaft adapted to be disposed in the valve chamber and movable between a first valve position, where said piston shaft is adapted to block the valve seat portion of the first outlet passage so that the water from the supply channel unit is forced to flow through the second outlet passage, and a second valve position, where said piston shaft is adapted to block the valve seat portion of the second outlet passage so that the water from the supply channel unit is forced to flow through the first outlet passage;

a tubular mount adapted to be mounted in the mounting hole of the water conveying device;

a piston actuator including: a rotary actuator adapted to be disposed in the valve chamber and coupled to said piston shaft such that axial rotation of said rotary actuator results in linear movement of said piston shaft in the valve chamber between the first and second valve positions; a hollow shaft body with a first end portion and an opposite second end portion which extends sealingly and rotatably into said tubular mount and which is coupled to said rotary actuator for rotating said rotary actuator; and a temperature sensor disposed within said shaft body for detecting temperature of water in the valve chamber; and an indicator unit mounted securely on said first end portion of said shaft body and associated operably with said temperature sensor so as to indicate the water temperature in the valve chamber thereon.

5. The flow control valve assembly of claim 4, wherein said shaft body and said rotary actuator are made of a heat conductive metal material.

6. The flow control valve assembly of claim 4, wherein said indicator unit has a magnifying face plate mounted thereon.

7. The flow control valve assembly of claim 4, wherein said indicator unit is formed with an annular skirt for concealing said shaft body therein.

8. The flow control valve assembly of claim 7, wherein said annular skirt is formed with a radial tab to facilitate rotation of said shaft body.

9. The flow control valve assembly of claim 4, wherein said rotary actuator is formed with an eccentric pin which is coupled to said piston shaft.

* * * * *